US010081398B2

(12) United States Patent
McMillan et al.

(10) Patent No.: US 10,081,398 B2
(45) Date of Patent: Sep. 25, 2018

(54) AIRFLOW MANAGEMENT SYSTEM FOR A VEHICLE

(71) Applicant: GM GLOBAL TECHNOLOGY OPERATIONS LLC, Detroit, MI (US)

(72) Inventors: Ethan A. McMillan, Warren, MI (US); Rebecca Diane Tjoelker, Commerce Charter Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 15 days.

(21) Appl. No.: 15/376,723

(22) Filed: Dec. 13, 2016

(65) Prior Publication Data

US 2018/0162458 A1 Jun. 14, 2018

(51) Int. Cl.
*B62D 35/02* (2006.01)
*B62D 37/02* (2006.01)
*B62D 35/00* (2006.01)

(52) U.S. Cl.
CPC ......... *B62D 35/005* (2013.01); *B62D 35/008* (2013.01); *B62D 35/02* (2013.01)

(58) Field of Classification Search
CPC ..... B62D 35/005; B62D 35/008; B62D 35/02
USPC .................................................. 296/180.1
See application file for complete search history.

(56) References Cited

U.S. PATENT DOCUMENTS

| 8,646,552 B2 * | 2/2014 | Evans | B60K 11/085 180/68.1 |
| 8,668,245 B2 * | 3/2014 | Kakiuchi | B62D 35/02 180/69.1 |

* cited by examiner

*Primary Examiner* — Joseph D. Pape
*Assistant Examiner* — Dana D Ivey
(74) *Attorney, Agent, or Firm* — Quinn IP Law

(57) ABSTRACT

An airflow management system is employed for a vehicle having a body configured to face an oncoming ambient airflow at a first body end and an underbody section configured to receive an underbody portion of the oncoming airflow when the vehicle is in motion. The system includes a vehicle fascia at the first body end for receiving a fascia portion of the oncoming airflow and an airflow deflector on the underbody section proximate the first body end. The system also includes an airflow duct for channeling the fascia portion of the airflow from the fascia to exit the duct between the fascia and the deflector at the underbody section orthogonal thereto. Thus exiting fascia airflow portion guides the underbody airflow portion around the deflector to reduce pressure of the underbody airflow portion on the airflow deflector and improves aerodynamic efficiency of the vehicle body when the vehicle is in motion.

20 Claims, 4 Drawing Sheets

AIRFLOW MANAGEMENT SYSTEM FOR A VEHICLE

INTRODUCTION

The disclosure relates to a system for managing ambient airflow and reducing aerodynamic lift and drag of a vehicle body.

Aerodynamics is a study of objects moving through air and is a significant factor in vehicle design, including automobiles. Automotive aerodynamics is the study of the aerodynamics of road vehicles. The main goals of the study are reducing vehicle drag and wind noise, minimizing noise emission, as well as preventing undesired lift forces and other causes of aerodynamic instability during cornering and at high speeds via management of airflow. The study is typically used to shape vehicle bodywork and add-on aerodynamic devices for achieving a desired compromise among the above characteristics for specific vehicle use. Additionally, the study of aerodynamics may be used to generate appropriate airflow into the vehicle passenger compartment and/or provide cooling for various vehicle components and systems.

SUMMARY

An airflow management system for a vehicle is disclosed. The subject vehicle has a vehicle body configured to face an oncoming ambient airflow and including a first vehicle body end and a second vehicle body end opposite of the first vehicle body end. The vehicle also has a vehicle underbody section configured to span a distance between the first and second vehicle body ends, and receive an underbody portion of the oncoming ambient airflow when the vehicle is in motion. The system includes a vehicle fascia arranged at the first vehicle body end and configured to receive a fascia portion of the oncoming ambient airflow. The system also includes an airflow deflector arranged on the vehicle underbody section proximate the first vehicle body end. The system additionally includes an airflow duct configured to channel the fascia portion of the oncoming ambient airflow from the vehicle fascia to the vehicle underbody section and direct the fascia portion of the oncoming ambient airflow to exit the airflow duct orthogonal to the vehicle underbody section between the vehicle fascia and the airflow deflector. Thus directed, the fascia portion of the oncoming ambient airflow guides the underbody portion of the oncoming ambient airflow around the deflector to reduce pressure of the underbody portion of the oncoming ambient airflow on the airflow deflector and improves aerodynamic efficiency of the vehicle body when the vehicle is in motion.

The airflow duct may include a first duct portion connected to the vehicle fascia and configured to receive the fascia portion of the oncoming ambient airflow substantially orthogonal to the vehicle fascia. The airflow duct may also include a second duct portion in fluid communication with the first duct portion and having an interior surface shaped to redirect the fascia portion of the oncoming ambient airflow to exit the airflow duct substantially orthogonal to the vehicle underbody section.

The airflow duct may also include an intermediate third duct portion providing fluid communication between the first duct portion and the second duct portion. The second duct portion may define a gradual, approximately 90-degree turn that may be positioned proximate or at the interface between the third duct portion and the second duct portion.

The vehicle may additionally include a road wheel arranged between the first and second vehicle body ends. The airflow duct may be arranged between the fascia and the road wheel.

The airflow deflector may be arranged between the second duct portion and the road wheel.

The airflow duct may also include a first fastening flange extending from the first duct portion and fixed to the vehicle fascia.

The airflow duct may additionally include a second fastening flange extending from the second duct portion and fixed to the vehicle underbody section.

The first fastening flange may be configured to be fixed to the vehicle fascia and the second fastening flange may be configured to be fixed to the vehicle underbody section, each via at least one fastener.

Each of the first, second, and third duct portions, and each of the first and second fastening flanges may be constructed from a polymeric material.

The first, second, and third duct portions, and the first and second fastening flanges may define a single, continuous, and monolithic, such as formed from a single piece of material, structure.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
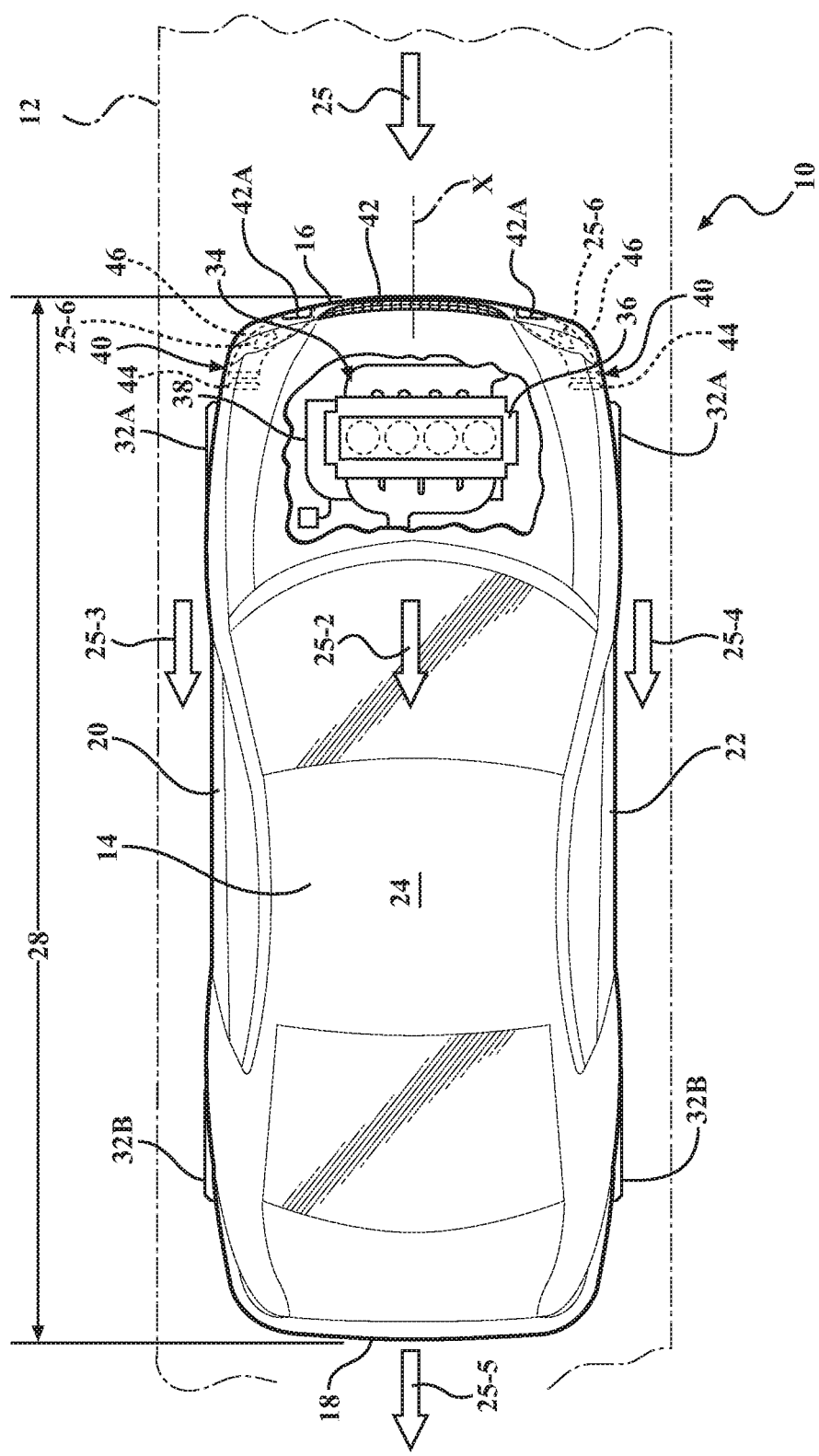
FIG. 1 is a schematic top view of a vehicle including a phantom view of an airflow management system including airflow deflectors and airflow ducts for ambient airflow passing relative to the vehicle, according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 having a longitudinal axis X. The vehicle body 14 defines six body sides. The six body sides include a first body end or front end 16, an opposing second body end or rear end 18, a left side or section 20, and a right side 22, a top body section 24, and an underbody section 26 (shown in FIG. 2). As understood by those skilled in the art, the front end 16 is configured to face oncoming or incident, i.e., approaching and contacting, ambient airflow 25, for example when the vehicle is in motion relative to the road surface 12.

As shown in FIG. 1, the top body section 24 is configured to span a distance 28 between the front and rear ends 16, 18 of the body 14. Although not specifically identified in the Figures, the top body section 24 may also include such components as a vehicle roof, a hood or bonnet, and a trunk lid. As shown in FIG. 1, the underbody section 26 is also configured to span the distance 28 between the front and rear ends 16, 18 of the body 14. The underbody section 26 may have a profile configured, such as shaped or formed, to accommodate components of various vehicle subsystems that will be discussed in greater detail below. The underbody section 26 also defines a space 30 between the vehicle body 14 and the road surface 12 (as shown in FIG. 3).

When the vehicle 10 is in motion, the underbody section 26 receives an underbody portion 25-1 of the oncoming ambient airflow 25, such that the space 30 permits the underbody airflow portion 25-1 to pass under the vehicle body 14, between the vehicle body 14 and the road surface 12. Also when the vehicle 10 is in motion, a top airflow portion 25-2 passes over the top body section 24. Additionally, a left airflow portion 25-3 passes around the left side 20 and a right airflow portion 25-4 passes around the right side 22. Accordingly, each of the airflow portions 25-1, 25-2, 25-3, and 25-4 is considered to be an external airflow portion with respect to the vehicle body 14. The external airflow portions 25-1, 25-2, 25-3, and 25-4 rejoin behind the rear end 18 in a wake area or recirculating airflow region 25-5 immediately behind the rear end 18 of the moving vehicle. As understood by those skilled in the art, the recirculating airflow region 25-5 is generally caused at elevated vehicle speeds by the flow of surrounding air around the body sides 18, 20, 22, 24, and 26.

Figure 2:
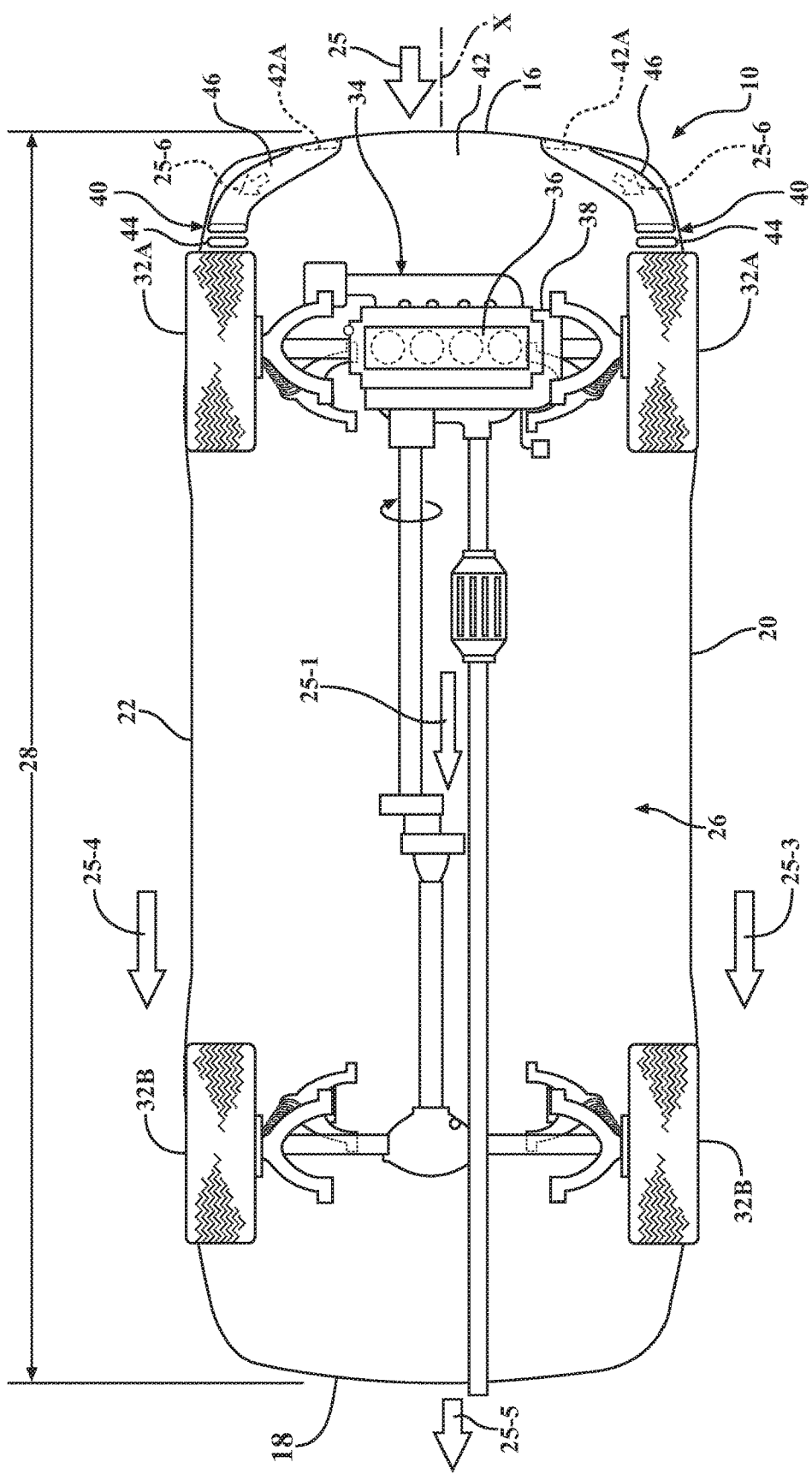
FIG. 2 is a schematic bottom view of the vehicle including a plan view of the airflow management system shown in FIG. 1.
Figure 3:
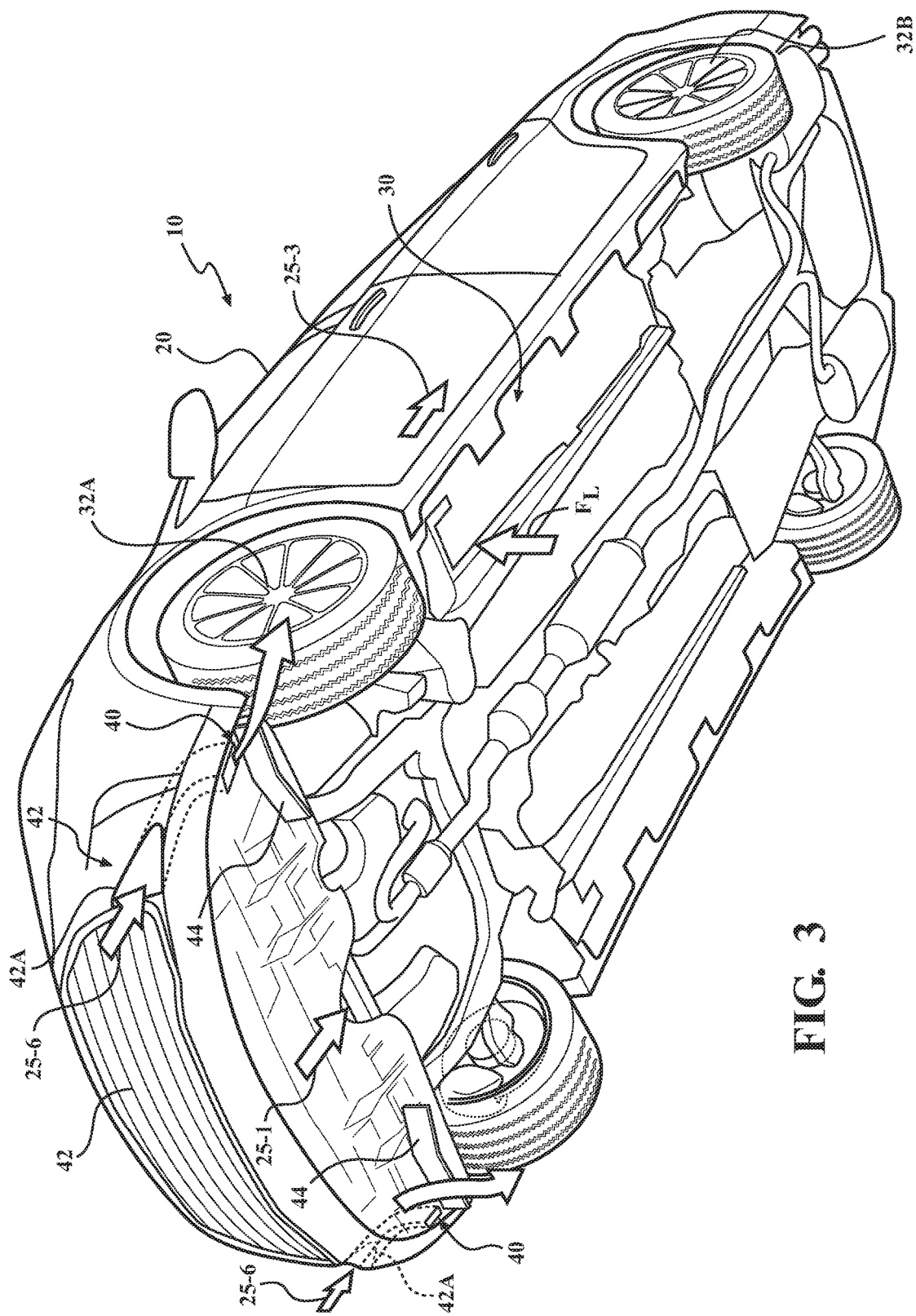
FIG. 3 is a schematic close-up partial side view of the vehicle depicting the airflow management system arranged in a particular corner of the vehicle shown in FIGS. 1-2.

With reference to FIGS. 1-3, the vehicle 10 includes a plurality of road wheels arranged between the first and second vehicle body ends 16, 18, proximate the left and right sides 20, 22, specifically front wheels 32A and rear wheels 32B. The vehicle 10 also includes a powertrain 34 that may include an internal combustion engine 36 for generating engine torque. The powertrain 34 may also include a transmission 38 operatively connecting the engine 36 to at least some of the road wheels 32A, 32B for transmitting engine torque thereto and thereby put the vehicle 10 in motion. The vehicle 10 also includes an airflow management system 40. The system 40 includes a vehicle fascia 42 arranged at the front end 16. The fascia 42 defines an aperture 42A configured to receive a fascia portion 25-6 of the oncoming ambient airflow 25. The system 40 also includes an airflow deflector 44 arranged on the vehicle underbody section 26 proximate the front end 16.

The system 40 additionally includes an airflow duct 46 configured to channel and guide the fascia airflow portion 25-6 from the fascia 42 to the vehicle underbody section 26. The duct 46 is also configured to direct the fascia airflow portion 25-6 to exit the duct substantially orthogonal to the underbody section 26 between the fascia 42 and the airflow deflector 44. Specifically, the fascia airflow portion 25-6 is directed by the duct 46 to exit at the underbody section 26 in front of and proximate the deflector 44, such that the flow direction of the fascia airflow portion is substantially perpendicular to the flow direction of the underbody airflow portion 25-1 and parallel to the deflector. Thus directed to exit perpendicular to the underbody airflow portion 25-1 in front of the deflector 44, the fascia airflow portion 25-6 cooperates with the underbody airflow portion 25-1 and guides the underbody airflow portion around the deflector. Such guidance of the underbody airflow portion 25-1 around the deflector 44 minimizes pressure of the underbody airflow portion on the deflector when the vehicle is in motion to reduce aerodynamic drag and aerodynamic lift $F_L$ on the vehicle body 14, i.e., improve aerodynamic efficiency of the vehicle body.

Figure 4:
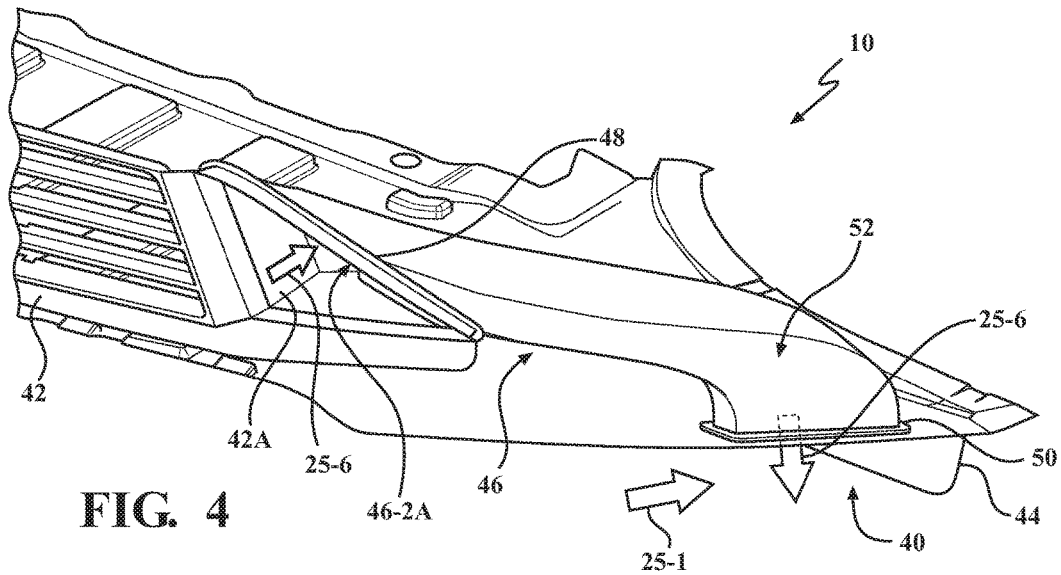
FIG. 4 is a schematic close-up partial perspective bottom view of the airflow management system shown in FIG. 3, according to one embodiment the disclosure.
Figure 5:
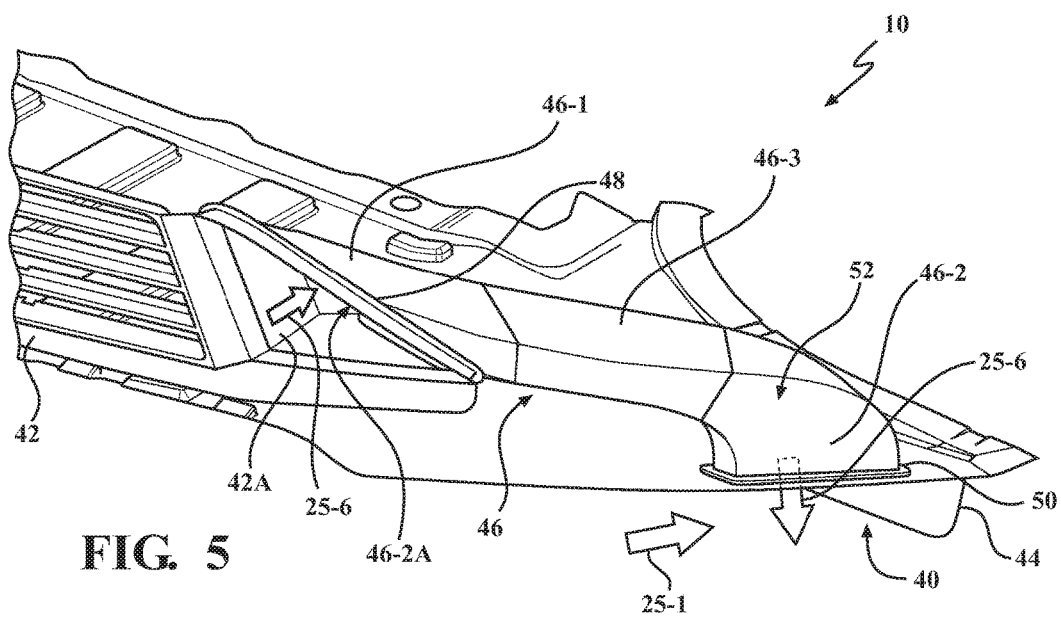
FIG. 5 is a schematic close-up partial perspective bottom view of the airflow management system shown in FIG. 3, according to another embodiment the disclosure.

Although the system 40 has heretofore been described with respect to a single deflector 44 and a single airflow duct 46, it is to be understood that the disclosed airflow management system includes at least two such deflectors and ducts, one per side 20 and 22 of the vehicle body 14. As shown, each airflow duct 46 is arranged between the fascia 42 and the front wheels 32A, while each deflector 44 is arranged between the individual duct 46 and the respective front wheel 32A. As shown in FIGS. 4 and 5 each duct 46 may include a respective first duct portion 46-1 connected to the fascia 42. As shown, the first duct portion 46-1 is configured to receive the fascia airflow portion 25-6 substantially orthogonal to the fascia 42. Each duct 46 may also include a respective second duct portion 46-2 in fluid communication with the particular first duct portion 46-1. According to the disclosure, each deflector 44 is located between the respective second duct portion 46-2 and the particular front wheel 32A.

Each second duct portion 46-2 may have an interior surface 46-2A shaped to redirect its share of the fascia airflow portion 25-6 to exit the particular duct 46 substantially orthogonal to the underbody section 26. Each duct 46 may additionally include an intermediate third duct portion 46-3 providing fluid communication between the respective first duct portion 46-1 and second duct portion 46-2 (shown in FIGS. 4 and 5). Accordingly, each duct 46 channels the fascia airflow portion 25-6 from the fascia 42 to the underbody section 26 via the respective first, second and third duct portions 46-1, 46-2, 46-3. As such, each second duct portion 46-2 is configured to exhaust its share of the fascia airflow portion 25-6 to join the underbody airflow portion 25-1 in front of the respective deflector 44.

The fascia airflow portion 25-6 exhausted from the particular second duct portion 46-2 and joined with the underbody airflow portion 25-1 in front of the respective deflector 44 guides the underbody airflow portion around the deflector when the vehicle 10 is in motion. After being joined with the underbody airflow portion 25-1, the specific redirected fascia airflow portion 25-6 is subsequently guided by the respective deflector 44 around the respective road wheel 32A to join one of the left and right airflow portions 25-3, 25-4 to pass along the respective left and right body sides 20, 22. Thus established and guided by the deflector 44, the motion of the combined underbody airflow portion 25-1 and redirected fascia airflow portion 25-6 decreases air pressure and aerodynamic lift $F_L$ on the vehicle body 14 in the space 30 when the vehicle 10 is in motion.

Each deflector 44 may be constructed from a polymeric material and be fastened to the vehicle underbody section 26 in front of the respective front wheel 32A, aft of the second duct portion 46-2 by appropriate fastening means or devices (not shown), such as via a catch, snap, clip, screw, etc. Each duct 46 may include a first fastening flange 48 extending from the first duct portion 46-1 and fixed to the fascia 42 and a second fastening flange 50 extending from the second duct portion 46-2 and fixed to the vehicle underbody section 26. The first fastening flange 48 may be fixed to the vehicle fascia 42, while the second fastening flange 50 may be fixed to the vehicle underbody section 26. Similar to that of the deflectors 44, the fastening of each respective first and second fastening flanges 48, 50 may be accomplished via appropriate fastener means or devices (not shown).

Each of the first, second, and third duct portions 46-1, 46-2, 46-3, and each of the first and second fastening flanges 48, 50 may be constructed from a polymeric material. Furthermore, as shown in FIG. 4, the first, second, and third duct portions 46-1, 46-2, 46-3, and the first and second fastening flanges 48, 50 may define a single, continuous, such as formed from a single piece of material, structure. Whether configured as a continuous, single-piece structure (shown in FIG. 4) or composed of assembled individual portions 46-1, 46-2, 46-3 and flanges 48, 50 (shown in FIG. 5), the airflow duct 46 may define an internal passage having a constant cross-sectional area through the first, second, and third duct portions 46-1, 46-2, 46-3. Additionally, as shown, the second duct portion 46-2 may define a gradual approximately 90-degree turn 52. Alternatively, although not shown, the turn 52 may be defined by the third duct portion 46-3. The turn 52 may be positioned proximate or at the interface between the third duct portion 46-3 and the second duct portion 46-1. If the turn 52 is positioned at the interface between the second and third duct portions 46-2, 46-3, the turn may be defined partially by each of the subject duct portions. Which portion(s) of the duct 46 define the turn 52 may be established in response to tooling and/or other manufacturing concerns.

Overall, the airflow management system 40 employing airflow deflectors 44 and airflow ducts 46 enhances aerodynamic efficiency of the vehicle body 14 and reduces power consumption from the engine 36 needed to maintain elevated vehicle speeds. Specifically, by being directed via the duct 46 to exit perpendicular to the underbody airflow portion 25-1, the fascia airflow portion 25-6 may guide the underbody airflow portion 25-1 around the deflector 44 to join the left and right airflow portions 25-3, 25-4 along the respective left and right body sides 20, 22. As a result, the airflow management system 40 may provide enhanced aerodynamic characteristics for the vehicle 10, improve the vehicle's energy efficiency, and reduce wind noise experienced by the vehicle's occupants at elevated road speeds.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An airflow management system for a vehicle having a vehicle body arranged along a longitudinal axis and configured to face an oncoming ambient airflow and including a first vehicle body end, a second vehicle body end opposite of the first vehicle body end, and a vehicle underbody section arranged along the longitudinal axis and configured to span a distance between the first and second vehicle body ends and receive an underbody portion of the oncoming ambient airflow when the vehicle is in motion, the system comprising:

a vehicle fascia arranged at the first vehicle body end and configured to receive a fascia portion of the oncoming ambient airflow;

an airflow deflector arranged on the vehicle underbody section proximate the first vehicle body end; and an airflow duct configured to channel the fascia portion of the oncoming ambient airflow from the vehicle fascia to the vehicle underbody section and direct the fascia portion of the oncoming ambient airflow to exit the airflow duct orthogonal to the vehicle underbody section between the vehicle fascia and the airflow deflector, in front of and proximate the deflector when viewed along the longitudinal axis, and thereby guide the underbody portion of the oncoming ambient airflow around the deflector to reduce pressure of the underbody portion of the oncoming ambient airflow on the airflow deflector and improve aerodynamic efficiency of the vehicle body when the vehicle is in motion.

2. The airflow management system of claim 1, wherein the airflow duct includes:

a first duct portion connected to the vehicle fascia and configured to receive the fascia portion of the oncoming ambient airflow orthogonal to the vehicle fascia; and a second duct portion in fluid communication with the first duct portion and having an interior surface shaped to redirect the fascia portion of the oncoming ambient airflow to exit the airflow duct orthogonal to the vehicle underbody section.

3. The airflow management system of claim 2, further comprising an intermediate third duct portion providing fluid communication between the first duct portion and the second duct portion.

4. The airflow management system of claim 2, wherein the vehicle additionally includes a road wheel arranged between the first and second vehicle body ends and the airflow duct is arranged between the vehicle fascia and the road wheel.

5. The airflow management system of claim 4, wherein the airflow deflector is arranged between the second duct portion and the road wheel.

6. The airflow management system of claim 2, wherein the airflow duct additionally includes a first fastening flange extending from the first duct portion and fixed to the vehicle fascia.

7. The airflow management system of claim 6, wherein the airflow duct additionally includes a second fastening flange extending from the second duct portion and fixed to the vehicle underbody section.

8. The airflow management system of claim 7, wherein the first fastening flange is configured to be fixed to the vehicle fascia and the second fastening flange is configured to be fixed to the vehicle underbody section, each via at least one fastener.

9. The airflow management system of claim 7, wherein each of the first, second, and third duct portions, and each of the first and second fastening flanges is constructed from a polymeric material.

10. The airflow management system of claim 9, wherein the first, second, and third duct portions, and the first and second fastening flanges define a single, continuous structure.

11. A vehicle comprising:

a vehicle body arranged along a longitudinal axis and configured to face an oncoming ambient airflow and including a first vehicle body end, a second vehicle body end opposite of the first vehicle body end, and a vehicle underbody section arranged along the longitudinal axis and configured to span a distance between the first and second vehicle body ends and receive an underbody portion of the oncoming ambient airflow when the vehicle is in motion;

a vehicle fascia arranged at the first vehicle body end and configured to receive a fascia portion of the oncoming ambient airflow;

an airflow deflector arranged on the vehicle underbody section proximate the first vehicle body end; and an airflow duct configured to channel the fascia portion of the oncoming ambient airflow from the vehicle fascia to the vehicle underbody section and direct the fascia portion of the oncoming ambient airflow to exit the airflow duct orthogonal to the vehicle underbody section between the vehicle fascia and the airflow deflector, in front of and proximate the deflector when viewed along the longitudinal axis, and thereby guide the underbody portion of the oncoming ambient airflow around the deflector to reduce pressure of the underbody portion of the oncoming ambient airflow on the airflow deflector and improve aerodynamic efficiency of the vehicle body when the vehicle is in motion.

12. The vehicle of claim 11, wherein the airflow duct includes:

a first duct portion connected to the vehicle fascia and configured to receive the fascia portion of the oncoming ambient airflow orthogonal to the vehicle fascia; and a second duct portion in fluid communication with the first duct portion and having an interior surface shaped to redirect the fascia portion of the oncoming ambient airflow to exit the airflow duct orthogonal to the vehicle underbody section.

13. The vehicle of claim 12, wherein the airflow duct additionally includes an intermediate third duct portion providing fluid communication between the first duct portion and the second duct portion.

14. The vehicle of claim 12, wherein the vehicle includes a road wheel arranged between the first and second vehicle body ends and the airflow duct is arranged between the vehicle fascia and the road wheel.

15. The vehicle of claim 14, wherein the airflow deflector is arranged between the second duct portion and the road wheel.

16. The vehicle of claim 12, wherein the airflow duct additionally includes a first fastening flange extending from the first duct portion and fixed to the vehicle fascia.

17. The vehicle of claim 16, wherein the airflow duct additionally includes a second fastening flange extending from the second duct portion and fixed to the vehicle underbody section.

18. The vehicle of claim 17, wherein the first fastening flange is fixed to the vehicle fascia and the second fastening flange is configured to be fixed to the vehicle underbody section, each via at least one fastener.

19. The vehicle of claim 17, wherein each of the first, second, and third duct portions, and each of the first and second fastening flanges is constructed from a polymeric material.

20. The vehicle of claim 19, wherein the first, second, and third duct portions, and the first and second fastening flanges define a single, continuous structure.

* * * * *